United States Patent
Wu (10) Patent No.: US 9,450,848 B1
(45) Date of Patent: Sep. 20, 2016

(54) METHODS AND APPARATUS FOR ADJUSTING A PHASE OF A TRANSMITTED SIGNAL BASED ON AN EVALUATION OF AN EYE OPENING IN AN EYE DIAGRAM

(71) Applicant: Marvell International LTD., Hamilton (BM)

(72) Inventor: Songping Wu, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/824,165

(22) Filed: Aug. 12, 2015

Related U.S. Application Data (60) Provisional application No. 62/042,542, filed on Aug. 27, 2014.

(51) Int. Cl.
| | | |
|---|---|---|
| *H04L 7/00* | (2006.01) | |
| *H04L 12/26* | (2006.01) | |
| *H04L 27/20* | (2006.01) | |

(52) U.S. Cl.
CPC ......... *H04L 43/087* (2013.01); *H04L 27/2035* (2013.01)

(58) Field of Classification Search
CPC .................. H04L 25/03019; H04L 25/03159; H04L 1/205; H04L 7/033; H04L 7/0062; H04L 2025/03356; H04L 1/247; H04L 25/4917; H04L 43/087; H04L 27/2035; G01R 13/0272; G01R 19/2509; H03M 1/1071; H03L 7/091
USPC ....... 375/224, 226, 354, 355, 371, 373, 275, 375/296, 316, 346
See application file for complete search history.

(56) References Cited

U.S. PATENT DOCUMENTS

| | | | | |
|---|---|---|---|---|
| 5,881,039 | A * | 3/1999 | Sano ...................... | G11B 7/005 369/59.15 |
| 8,649,476 | B2 * | 2/2014 | Malipatil .............. | H04L 7/0062 375/219 |
| 9,215,063 | B2 * | 12/2015 | Wiley ..................... | H04L 1/205 |
| 2002/0186159 | A1 * | 12/2002 | Reinhold ................. | H03L 7/00 341/155 |

(Continued)

OTHER PUBLICATIONS

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

(Continued)

*Primary Examiner* — Tesfaldet Bocure (57) ABSTRACT

A first network device including modulation, transmit, front end, and phase modules. The modulation module amplitude or frequency modulates a data signal to generate a modulated signal. The transmit module transmits an output signal based on the modulated signal. The front end module obtains a phase of a point in a first cluster of index ratios. Each of the index ratios corresponds to a respective phase of a respective symbol period of the output signal. Each of the index ratios is based on a maximum amplitude, a minimum amplitude or a mean of amplitudes of the output signal over the symbol periods. The amplitudes for each of the means includes a corresponding one of the maximum amplitudes and a corresponding one of the minimum amplitudes. The phase module adjusts a phase of the output signal based on the phase of the point in the first cluster of index ratios.

30 Claims, 6 Drawing Sheets

(56) References Cited

U.S. PATENT DOCUMENTS

| | | | | |
|---|---|---|---|---|
| 2003/0165208 A1* | 9/2003 | Carter | ............... | H03L 7/0891 375/373 |
| 2010/0165915 A1* | 7/2010 | Kuechler | ............ | H04L 1/205 370/328 |
| 2011/0002370 A1* | 1/2011 | Ikedo | ............ | G01R 13/0218 375/224 |
| 2011/0050339 A1* | 3/2011 | Ohkawara | ......... | H03F 1/3294 330/149 |

OTHER PUBLICATIONS 802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.

"Specification of the Bluetooth System" Master Table of Contents & Compliance Requirements—Covered Core Package version: 4.0; Jun. 30, 2010; 2302 pages.

IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.

IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.

IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.

* cited by examiner

METHODS AND APPARATUS FOR ADJUSTING A PHASE OF A TRANSMITTED SIGNAL BASED ON AN EVALUATION OF AN EYE OPENING IN AN EYE DIAGRAM

CROSS-REFERENCE TO RELATED APPLICATIONS

This application claims the benefit of U.S. Provisional Application No. 62/042,542, filed on Aug. 27, 2014. The entire disclosure of the application referenced above is incorporated herein by reference.

FIELD

The present disclosure relates to signal quality monitoring systems, and more particularly to systems that adjust transmission parameters for improved signal quality.

BACKGROUND

Communication systems typically include a receiver that is configured to receive a signal transmitted from a transmitter. Jitter and/or noise can negatively affect the quality of a signal (signal quality) received by a receiver, and such an effect on signal quality can adversely impact the performance of a receiver in properly decoding a received signal. Signal quality can affect whether two network devices are able to communicate with each other. For example, a first network device may transmit a signal to a second network device to establish a link with the second network device. The second network device may determine quality of the received signal and based on the quality of the received signal send a response message back to the first network device. For example, if the quality of the received signal is less than a predetermined threshold, the second network device may not send a response message, or the second network device may send a response message indicating a link has not been established with the second network device.

Multiple techniques exist for directly or indirectly determining quality of a received signal. As a first example, a system may generate a received signal strength indication (RSSI) of the received signal, which is directly related to power (or strength) of the received signal. The higher the RSSI, the better the signal quality. As another example, the system may determine a signal-to-noise ratio (SNR). This includes determining a ratio between power (or amplitude) of a data signal and power (or amplitude) of noise on the data signal. A SNR may be measured statistically over an observation window to improve reliability of the measurement.

As yet another example, a system may perform an error vector measurement (EVM) to determine quality of a received signal. This includes observing constellation points of the received signal and quantizing differences between the constellation points and predetermined points to determine the quality of the received signal. A bit-error-rate (BER) may also or alternatively be determined to provide an indication of signal quality. The lower the BER, the better the quality of the received signal.

As a further example, a system may measure a characteristic in an eye-opening of an eye diagram to determine signal quality. An eye diagram can be created by overlaying traces of a signal having a non-repeating pattern. Characteristics of an eye diagram, such as width or height of the eye-opening of the eye diagram can be measured. Typically, the larger the eye-opening, the better the quality of the received signal. Measuring the size of the eye-opening is especially useful for systems using binary or quadrature amplitude modulation or frequency modulation, such as pulse-amplitude modulation (PAM) or frequency shift keying (FSK) modulation.

SUMMARY

A first network device is provided and includes a modulation module, a transmit module, a front end module, and a phase module. The modulation module is configured to amplitude modulate or frequency modulate a data signal to generate a modulated signal. The transmit module is configured to transmit an output signal based on the modulated signal. The front end module is configured to obtain a phase of a point in a first cluster of index ratios. Each of the index ratios corresponds to a respective phase of a respective symbol period of the output signal. Each of the index ratios is based on (a) a maximum amplitude of the output signal over the symbol periods, (b) a minimum amplitude of the output signal over the symbol periods, or (c) a mean of amplitudes of the output signal over the symbol periods. The amplitudes for each of the means includes a corresponding one of the maximum amplitudes and a corresponding one of the minimum amplitudes. The phase module is configured to adjust a phase of the output signal based on the phase of the point in the first cluster of index ratios.

In other features, a method is provided and includes: at a first network device, amplitude modulating or frequency modulating a data signal to generate a modulated signal; based on the modulated signal, transmitting an output signal from the first network device to a second network device; and evaluating an eye opening of an eye diagram of the output signal including obtaining a phase of a point in a first cluster of index ratios. Each of the index ratios corresponds to a respective phase of a respective symbol period of the output signal. Each of the index ratios is based on (a) a maximum amplitude of the output signal over the symbol periods, (b) a minimum amplitude of the output signal over the symbol periods, or (c) a mean of amplitudes of the output signal over the symbol periods. The amplitudes for each of the means includes a corresponding one of the maximum amplitudes and a corresponding one of the minimum amplitudes. The method further includes adjusting a phase of the output signal based on the phase of the point in the first cluster of index ratios.

In other features, a first network device is provided and includes a receive module, an eye opening module, and a transmit module. The receive module is configured to receive an output signal from a second network device. The output signal is amplitude modulated or frequency modulated. The eye opening module is configured to evaluate an eye opening of an eye diagram of the output signal including (i) determining index ratios for the output signal, (ii) determining a first cluster of index ratios in the index ratios, and (iii) determining a point in the cluster of index ratios. Each of the index ratios corresponds to a respective phase of a respective symbol period of the output signal. Each of the index ratios is based on (a) a maximum amplitude of the output signal over the symbol periods, (b) a minimum amplitude of the output signal over the symbol periods, or (c) a mean of amplitudes of the output signal over the symbol periods. The amplitudes for each of the means includes a corresponding one of the maximum amplitudes and a corresponding one of the minimum amplitudes. The transmit module is configured to transmit a value from the first network device to the second network device to adjust a phase of the output signal. The value is indicative of a phase for the point in the cluster of index ratios.

In other features, a method is provided and includes: receiving an output signal at a first network device from a second network device, where the output signal is amplitude modulated or frequency modulated; and evaluating an eye opening of an eye diagram of the output signal including (i) determining index ratios for the output signal, (ii) determining a first cluster of index ratios in the index ratios, and (iii) determining a point in the cluster of index ratios, where each of the index ratios corresponds to a respective phase of a respective symbol period of the output signal. Each of the index ratios is based on (a) a maximum amplitude of the output signal over the symbol periods, (b) a minimum amplitude of the output signal over the symbol periods, or (c) a mean of amplitudes of the output signal over the symbol periods. The amplitudes for each of the means includes a corresponding one of the maximum amplitudes and a corresponding one of the minimum amplitudes. The method further includes transmitting a value from the first network device to the second network device to adjust a phase of the output signal. The value is indicative of a phase for the point in the cluster of index ratios.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Time domain modulation and frequency domain modulation are used in various communication systems for transmitting data between network devices. Examples of time domain modulation are PAM2 and PAM4. PAM is a form of signal modulation where message information is encoded into amplitudes of a series of signal pulses. The amplitudes of a series of carrier pulses are varied according to a sample value of the message signal. A PAM2 modulator maps an amplitude of a signal representing a single bit of data to one of two possible levels (two symbols), for example, to a −1 volt (V) or a +1 V. A single bit of data is mapped at a time using PAM2. A PAM4 modulator maps an amplitude of a signal representing two bits of data to one of four possible levels (four symbols), for example, to −3 V, −1 V, +1 V, and +3 V. Two bits of data are mapped at a time using PAM4. For a given baud rate, PAM4 modulation can be used to transmit up to twice the number of bits as PAM2 modulation. PAM2 and PAM4 are often used for transferring data via serializer/deserializer (SERDES) interfaces, such as via peripheral component interconnect express (PCIe) interfaces, universal serial bus (USB) interfaces, serial advanced technology attachment (SATA) interfaces, Ethernet interfaces, and/or other SERDES interfaces. Examples of frequency domain modulation are: Gaussian minimum shift keying (GMSK) modulation, which is used in global systems for mobile communication (GSM) devices; Bluetooth® modulation; and frequency modulation using a single-carrier according to Institute of Electrical and Electronic Engineers (IEEE) 802.11ad.

For systems using time domain modulation or frequency domain modulation, the size of an eye-opening (e.g., the width of an eye diagram and/or the height of an eye diagram) provides a direct measure of signal quality. The width (or horizontal opening) of an eye diagram indicates how much jitter a receiver can handle while maintaining signal quality within a predetermined range. For example, while maintaining signal quality within the predetermined range, the larger the horizontal opening of an eye diagram the higher the threshold for jitter. The height (or vertical opening) of an eye diagram indicates how much noise a receiver can handle while maintaining signal quality within a predetermined range.

The following disclosed examples include evaluating eye-openings of eye diagrams of received signals for maximum signal quality. Phase of a transmitted signal is selected for a corresponding transmitter and modulation technique to maximize quality of the signal as received at a receiver.

Figure 1:
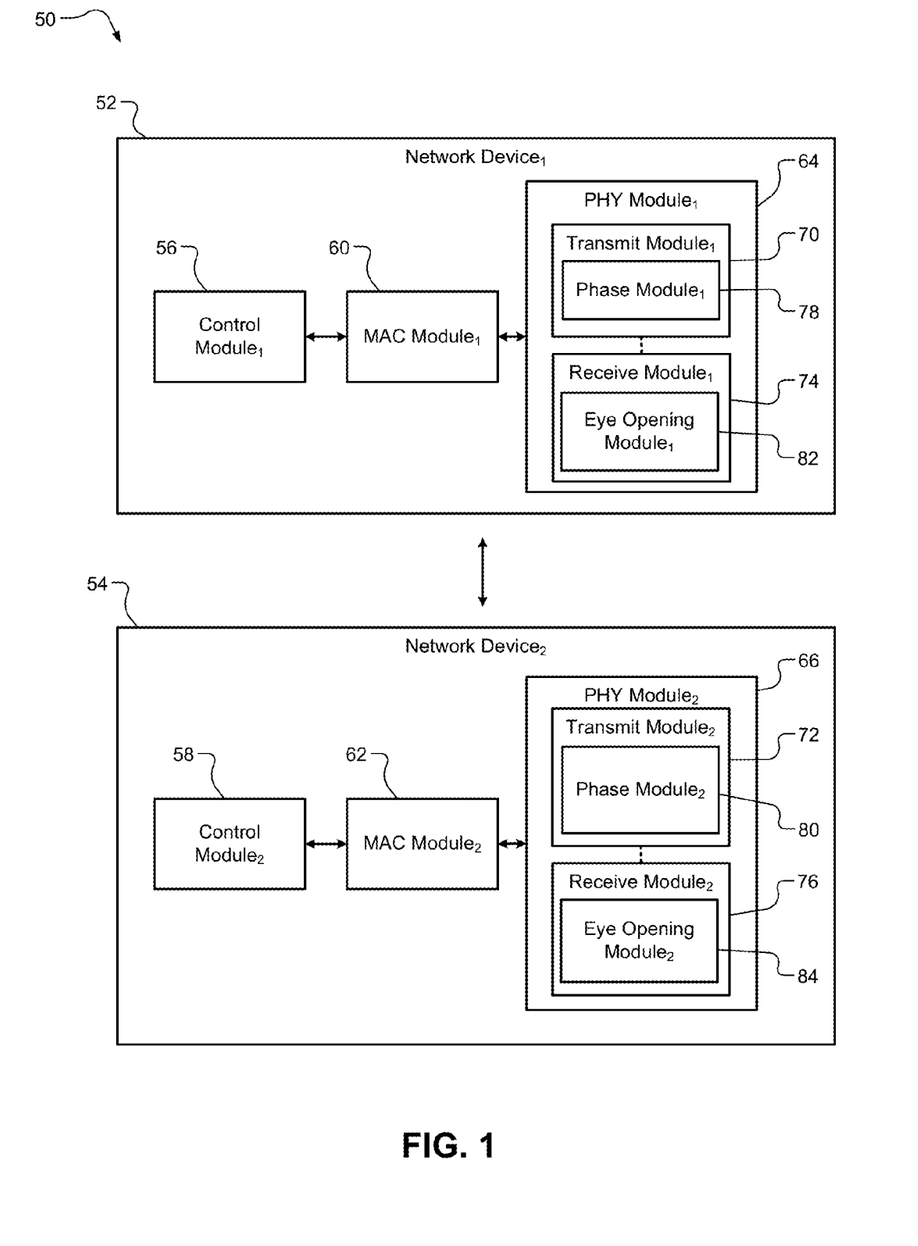
FIG. 1 is a functional block diagram of a wireless local area network including network devices with respective phase modules and eye opening modules in accordance with an aspect of the present disclosure.

FIG. 1 shows a communication system 50 that includes a first network device 52, which is in communication with a second network device 54. Signals transmitted between the network devices 52, 54 may be wireless transmitted or may be transmitted via wires. The network devices 52, 54 may be implemented in a wireless local area network or other network. The network devices 52, 54 include respective control modules 56, 58, medium access control (MAC) modules 60, 62, and physical layer (PHY) modules 64, 66. The control modules 56, 58 may respectively transmit data to the MAC modules 60, 62 and/or respectively receive data from the MAC modules 60, 62. The MAC modules 60, 62 may respectively transmit data to the PHY modules 64, 66 and/or respectively receive data from the PHY modules 64, 66. The PHY modules 64, 66 respectively include transmit modules 70, 72 and receive modules 74, 76.

The transmit modules 70, 72 may include and/or be implemented as transceivers and respectively include phase modules 78, 80. The receive modules 74, 76 may include and/or be implemented as receivers and respectively include eye opening modules 82, 84. The phase modules 78, 80 control, select and/or adjust phase of transmitted signals. The adjustment of phase may be based on characteristics of an eye opening, index ratios and/or a selected phase, which may be provided by the eye opening modules 82, 84. Examples of index ratios are described below. The eye opening modules 82, 84 monitor eye openings of eye diagrams of received signals and determine characteristics and/or index ratios of the eye openings. The eye opening modules 82, 84 may determine a phase for: maximum values of one or more characteristics of an eye opening; and/or an index ratio that is be below a predetermined threshold. One or more of the eye opening modules 82, 84 may indicate the characteristics, index ratios and/or the phase to the phase modules 78, 80. Monitoring characteristics of an eye opening of an eye diagram, determining corresponding index ratios of transmitted signals, adjusting phase of the transmitted signals are further described below with respect to FIGS. 2-4.

Figure 2:
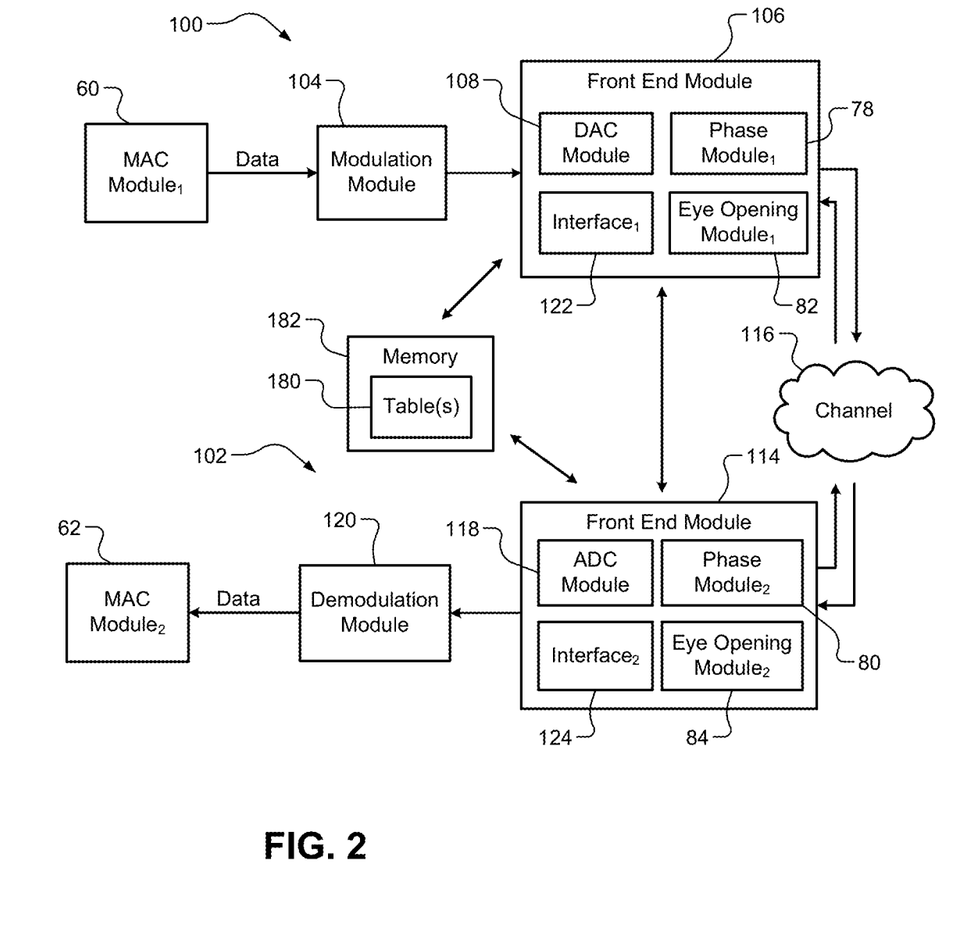
FIG. 2 functional block diagram illustrating example portions of a transmit module and a receive module implementing a time domain based method in accordance with an aspect of the present disclosure.

FIG. 2 shows examples of respective portions 100, 102 of the transmit module 70 and the receive module 76 of FIG. 1. The portion 100 may include a modulation module 104 and a front end module 106. The modulation module 104 may include and/or be implemented as a modulator and receives data from a MAC module (e.g., the MAC module 60). The modulation module 104 may perform time domain modulation, such as PAM, PAM3, PAM4 or other suitable amplitude modulation. The front end module 106 includes a digital-to-analog converter (DAC) module 108, the phase module 78 and the eye opening module 82. The DAC module 108 may include and/or be implemented as a DAC. Modulated data out of the modulation module 104 is received at the front end module 106 and may be converted from digital data to analog data via the DAC module 108.

The front end module 106 and/or the phase module 78 generate an output signal based on the digital data and/or the analog data. The phase module 78 controls, selects and/or adjusts phase of the output signal. The phase may be adjusted based on (i) characteristics of an eye opening of an eye diagram and/or corresponding index ratios of the output signal as transmitted by the front end module 106, and/or (ii) characteristics of an eye opening of an eye diagram and/or corresponding index ratios of the output signal as received by a front end module 114 of the portion 102.

The output signal may be transmitted from the front end module 106 to the front end module 114 via a channel 116. The channel 116 may be a wireless or wire based channel. The channel 116 may include and/or be implemented as a storage medium, such as a disk or solid-state memory. Characteristics of the eye opening and/or index ratios may be determined by an eye opening module (e.g., the eye opening module 84) and transmitted to a phase module (e.g., the phase module 78) via the channel 116 and/or directly between the front end modules 106, 114. As an alternative, characteristics of an eye opening and/or the index ratios of the output signal may be determined by an eye opening module 82 of the front end module 106 and used to adjust the phase of the output signal.

The front end module 114 may include the phase module 80, the eye opening module 84 and an analog-to-digital converter (ADC) module 118. The ADC converter module 118 may include and/or be implemented as an ADC. The ADC module 118 converts analog data to digital data. An output of the ADC module 118 is provided to a demodulation module 120, which demodulates the analog data and/or the digital data. The demodulation module 120 may include and/or be implemented as a demodulator and may, for example, perform amplitude demodulation, such as inverse PAM, PAM2, or PAM4. The demodulated data is provided from the demodulation module 120 to the MAC module 62.

Although FIG. 2 is primarily described above with respect to time domain modulation and/or amplitude modulation, the modules of FIG. 2 may be modified to implement frequency modulation. For example, the modulation module 104 and the demodulation module 120 may implement respectively frequency modulation and frequency demodulation. Also, the front end modules 106, 114 may include SERDES interfaces and/or other interfaces (shown as interfaces 122, 124) for communication with each other. The interfaces 122, 124 may be PCIe interfaces, USB interfaces, SATA interfaces, Ethernet interfaces, SERDES interfaces, and/or other suitable interfaces. The interfaces 122, 124 may be used for communicating over the channel 116.

Figure 3:
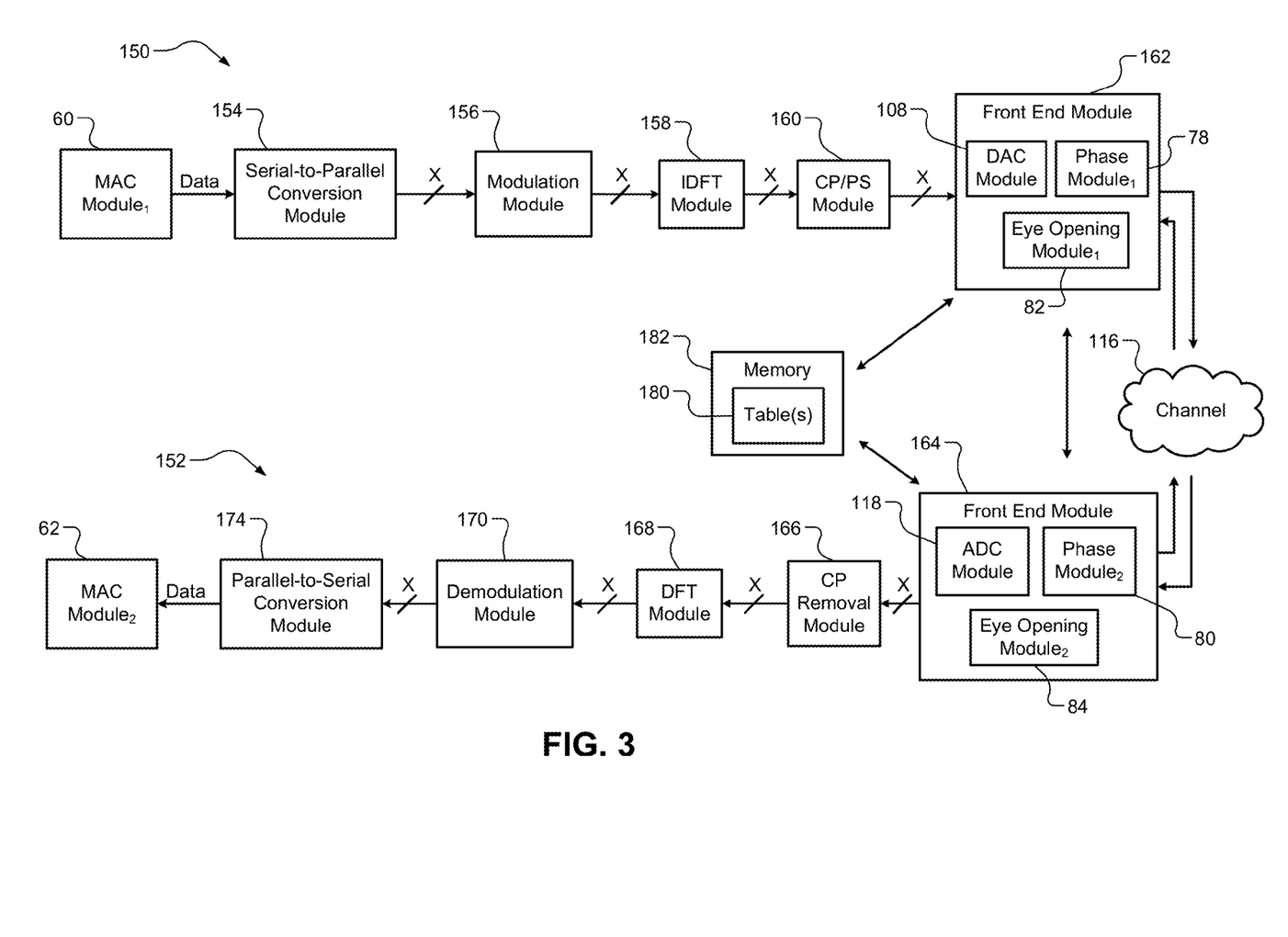
FIG. 3 is a functional block diagram illustrating example portions of a transmit module and a receive module illustrating a frequency domain based method in accordance with an aspect of the present disclosure.

FIG. 3 shows other examples of respective portions 150, 152 of the transmit module 70 and the receive module 76 of FIG. 1. The portion 150 may include a serial-to-parallel conversion module 154, a modulation module 156, an inverse discrete Fourier transform (IDFT) module 158, a cyclical prefix (CP) and pulse shaping (PS) module 160 and a front end module 162. The serial-to-parallel conversion module 154 may include and/or be implemented as a serial-to-parallel converter and/or SERDES and receives data from the MAC module 60. The serial-to-parallel conversion module 154 may convert data from being in a serial format to being in a parallel format. This is shown by X parallel lines between the serial-to-parallel conversion module 154, where X is an integer greater than or equal to two.

The modulation module 156 may perform frequency modulation, such as GMSK modulation, Bluetooth® modulation, frequency modulation using a single-carrier according to IEEE 802.11ad and/or other suitable frequency modulation. The IDFT module 158 performs an inverse discrete Fourier transform on the output of the modulation module 156 to convert data in the frequency domain to data in the time domain. The CP and pulse shaping module may add a cyclical prefix to the data and/or perform pulse shaping. In one implementation, the CP and pulse shaping module is not included.

The portion 152 includes a front end module 164 that communicates with the front end module 162 via the channel 116. The front end module 164 includes the phase module 80, the eye opening module 84 and the ADC module 118. The portion 152 may further include a CP removal module 166, a discrete Fourier transform (DFT) module 168, a demodulation module 170 and a parallel-to-serial conversion module 174. The parallel-to-serial conversion module 174 may include and/or be implemented as a parallel-to-serial converter. The DFT module 168 performs a fast Fourier transform of the output of the CP removal module 166, the ADC module 118 and/or the front end module 164. The demodulation module 170 demodulates an output of the DFT module 168. The parallel-to-serial conversion module 174 converts serial data to parallel data, which is provided to the MAC module 62.

The eye opening characteristics, phases, and index ratios determined by the front end modules 106, 114, 162, 164, phase modules 78, 80, and/or eye opening modules 82, 84 may be stored as one or more tables 180 in one or more memories (an example memory 182 is shown in FIGS. 2 and 3). The one or more memories may be located in the network devices 52, 54 of FIG. 1 and may be accessible to any of the modules in the portions 100, 102, 150, 152 of FIGS. 2-3.

Although the modules of FIGS. 2-3 are shown as being connected in a certain order, the modules may be connected in a different order and as a result the corresponding tasks of the modules may be performed in a different order. For example, the serial-to-parallel conversion module 154 and/or the modulation module 156 of FIG. 3 may be connected downstream from the IDFT module 158 and/or the DAC module 108 and thus perform corresponding tasks subsequent to tasks of the IDFT module 158 and/or the DAC module 108. As another example, although the eye opening modules 82, 84 are primarily described above and below with respect to the method of FIG. 4 as monitoring an eye opening of an output signal transmitted from the front end module 162, the eye opening modules 82, 84 may monitor eye openings of signals output from other ones of the modules 104, 108, 118, 120, 154, 156, 158, 160, 166, 168, 170, 174. Also, one or more of the modules 104, 108, 118, 120, 154, 156, 158, 160, 166, 168, 170, 174 of FIGS. 2 and 3 may not be included in the portions 100, 102, 150, 152. Some of the modules of FIGS. 2 and 3 are further described below with respect to the method of FIG. 4. For further defined structure of the modules of FIGS. 1-3 see below provided method of FIG. 4 and below provided definition for the term "module".

Figure 4:
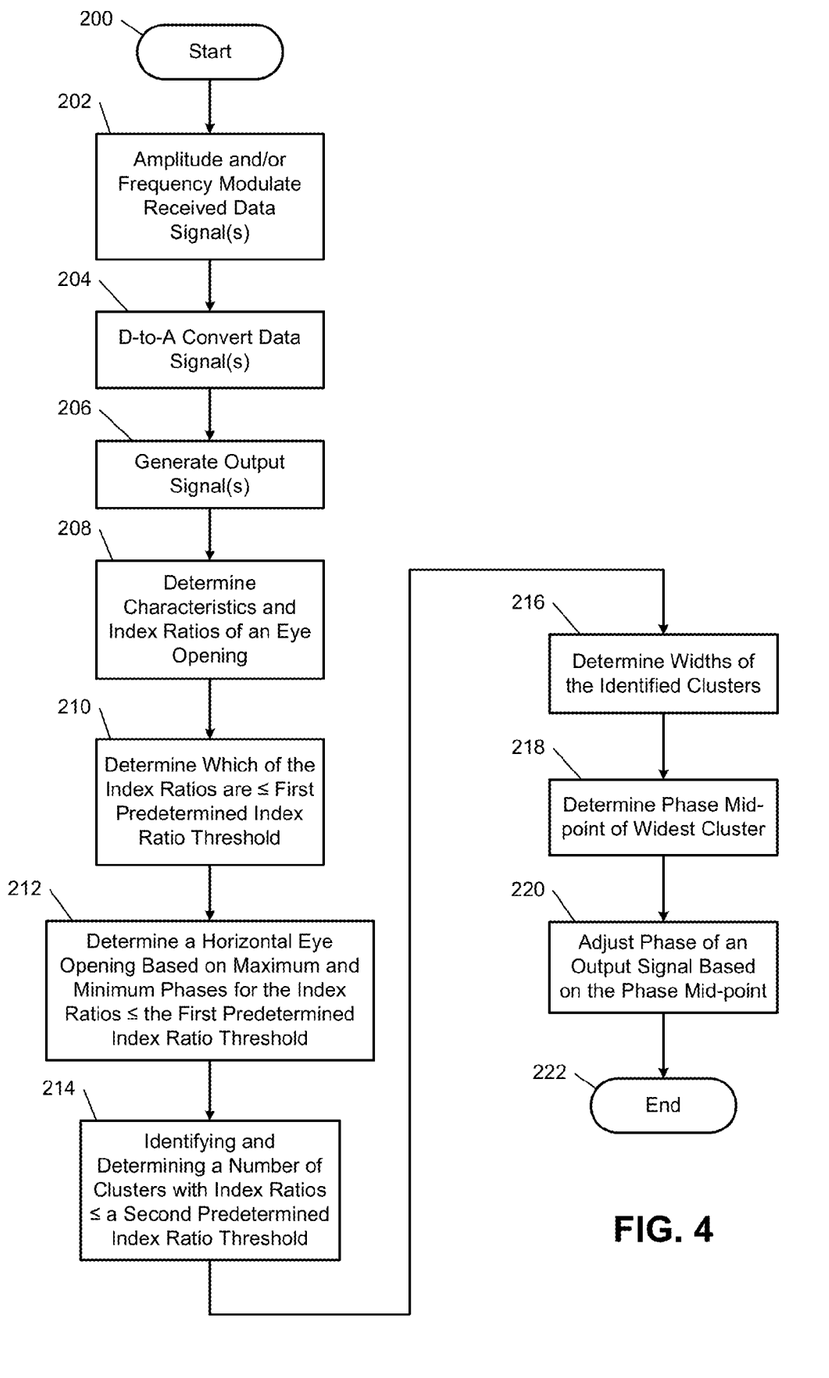
FIG. 4 illustrates a method of adjusting phase and maximizing signal quality in accordance with an aspect of the present disclosure.

The network devices disclosed herein may be operated using numerous methods, an example method is illustrated in FIG. 4. FIG. 4 shows a method of adjusting phase and maximizing signal quality. Although the following tasks are primarily described with respect to the implementations of FIGS. 1-3, the tasks may be easily modified to apply to other implementations of the present disclosure. The tasks may be iteratively performed.

The method may begin at 200. At 202, a modulation module (e.g., one of the modulation modules 104, 156) of a first network device (e.g., the first network device 52) amplitude and/or frequency modulates one or more received data signals. The data signals include data received in a serial or a parallel format.

At 204, a DAC module (e.g., the DAC module 108) may convert an output of the modulation module from a digital format to an analog format. Task 204 may be skipped, such that a digital data signal is transmitted at 206. At 206, a first front end module (e.g., one of the front end modules 106, 114) generates one or more output signals (hereinafter and for the following tasks referred to as "the output signal"). The output signal includes the data and is transmitted to a second network device (e.g., the second network device 54).

Figure 5A:
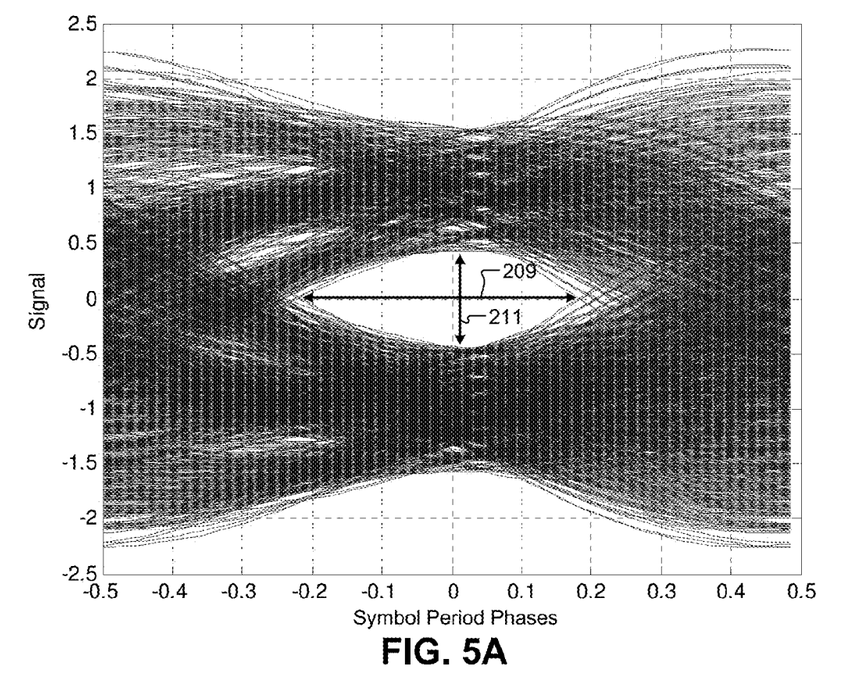
FIG. 5A is an eye diagram illustrating an eye opening of a PAM signal for a single symbol period.
Figure 6A:
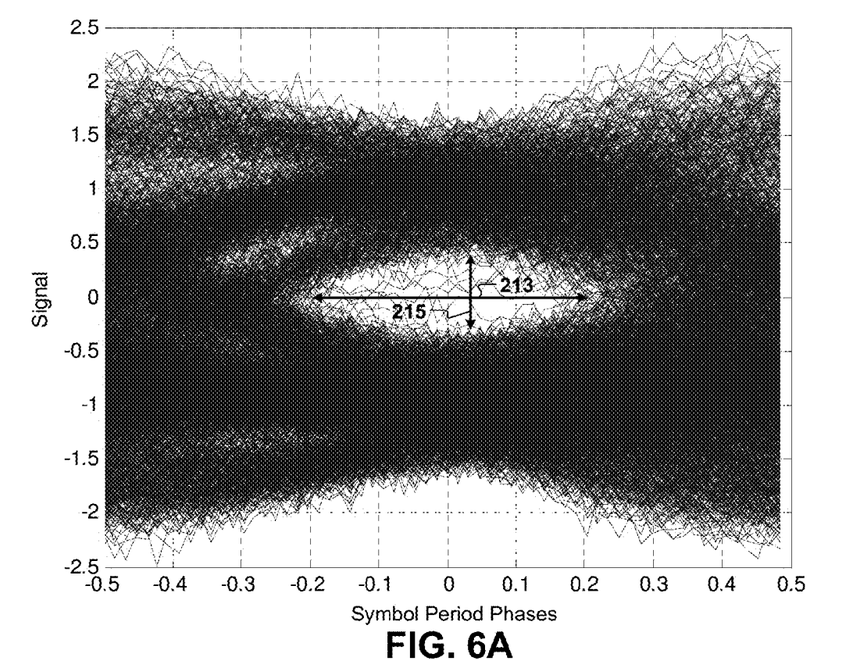
FIG. 6A is an eye diagram illustrating an eye opening of another PAM signal for a single symbol period.

At 208, one or more eye opening modules (e.g., the eye opening modules 82, 84) monitor the output signal and may determine characteristics of an eye opening and/or index ratios of the output signal or other monitored signal. The characteristics may include height and/or width of the eye opening. Examples of eye diagrams are shown in FIGS. 5A and 6A for different PAM output signals having respective jitter and noise. A horizontal eye opening and a vertical eye opening for the eye diagram of FIG. 5A are represented by arrows 209, 211. A horizontal eye opening and a vertical eye opening for the eye diagram of FIG. 6A are represented by arrows 213, 215. Each of the eye diagrams includes overlapping traces, where each trace is provided for a respective symbol period of the corresponding output signal. The traces have a non-repeating pattern and as a result provide the shown eye opening. As an example, 64 samples of the output signals may be acquired for each symbol period to provide each trace. Each of the eye diagrams is a plot of amplitudes of the corresponding output signal versus phase of the corresponding symbol period.

Index ratios respectively for phases within a predetermined range (or observation window), for example, between 0-2π may be determined for one or more symbol periods of an output signal and/or other monitored signal. The phases may be uniformly distributed phases within the predetermined range. For example, index ratios for phases at every 1/10, 1/20, and/or 1/100 of a symbol period may be determined. Each of the index ratios may be determined using, for example, equation 1, where: A is the index ratio; n denotes a certain value from 0-2π; m indicates a certain symbol period of the output signal for which $|F\{n\}|_{max}$, $|F\{n\}|_{min}$, and $F_{mean}$ are determined; M is a number of symbol periods used for determining $|F\{n\}|_{max}$, $|F\{n\}|_{min}$, and $F_{mean}$; $|F\{n\}|_{max}$ is a maximum amplitude for the symbol period m of the output signal; $|F\{n\}|_{min}$ is a minimum amplitude for the symbol period m of the output signal; F mean is a mean amplitude for the symbol period m of the output signal and is equal to $1/m\Sigma_{m \in M}|F\{n\}|_m$; and the symbol || is absolute value. Each $F_{mean}$ is a mean of amplitudes for a corresponding phase over one or more symbol periods.

$$A = \frac{||F\{n\}|_{max} - |F\{n\}|_{min}|}{\frac{1}{m}\sum_{m \in M}|F\{n\}|_m} = \frac{||F\{n\}|_{max} - |F\{n\}|_{min}|}{F_{mean}} \quad (1)$$

Each of the index ratios is an absolute value of a difference between a maximum amplitude and a minimum amplitude divided by a mean of amplitudes for a particular phase over one or more symbol periods of a monitored signal. The amplitudes monitored for determining $|F\{n\}|_{max}$, $|F\{n\}|_{min}$, and $F_{mean}$ may be voltage amplitudes of a time domain (or amplitude modulated) signal or a frequency domain (or frequency modulated) signal. The time domain signal or the frequency domain signal may be the output signal of the first front end module or output of another monitored module. The determined index ratios and corresponding phases may be stored as a table in a memory (e.g., the memory 182 or one or more other memories of the network devices). Equation 1 is not dependent on $|F\{n\}|_{max}$ alone, but rather may be dependent on $|F\{n\}|_{max}$, $|F\{n\}|_{min}$, and/or $F_{mean}$. The maximum amplitude $|F\{n\}|_{max}$ alone is not representative of signal quality, since the value of $|F\{n\}|_{max}$ can vary greatly for the same phase.

At 210, the one or more eye opening modules, based on the determined index ratios, determine which of the index ratios are less than or equal to a first predetermined index ratio threshold. Examples of plots 217, 219 of index ratios for the eye diagrams of FIGS. 5A, 6A are shown respectively in FIGS. 5B, 6B. As an example, the first predetermined index ratio threshold may be 1.9, as represented by the top horizontal lines of boxes 221, 223. The first predetermined index ratio threshold may be determined empirically using simulations and field tests.

At 212, the one or more eye opening modules determine the horizontal eye opening based on a maximum phase and a minimum phase of the symbol period for the index ratios less than or equal to the first predetermined index ratio threshold. For example, in FIG. 5B, the maximum phase for index ratios less than or equal to the first predetermined index ratio threshold is 0.18. The minimum phase for the index ratios less than or equal to the first predetermined index ratio threshold is −0.2. For FIG. 6B, the maximum phase, for index ratios less than or equal to the first predetermined index ratio threshold, is 0.13. The minimum phase, for the index ratios less than or equal to the first predetermined index ratio threshold, is −0.12. The horizontal eye opening is a difference between the maximum phase and the minimum phase or 0.38 for FIGS. 5A and 5B and 0.25 for FIGS. 6A and 6B.

Figure 5B:
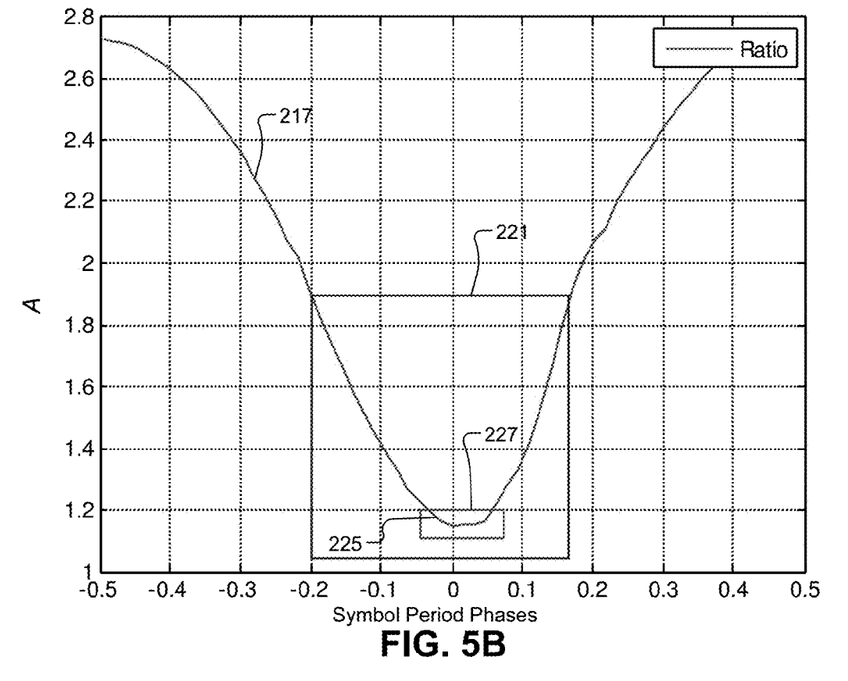
FIG. 5B is a corresponding plot of an index ratio A for the eye diagram of FIG. 5A in accordance with an aspect of the present disclosure.
Figure 6B:
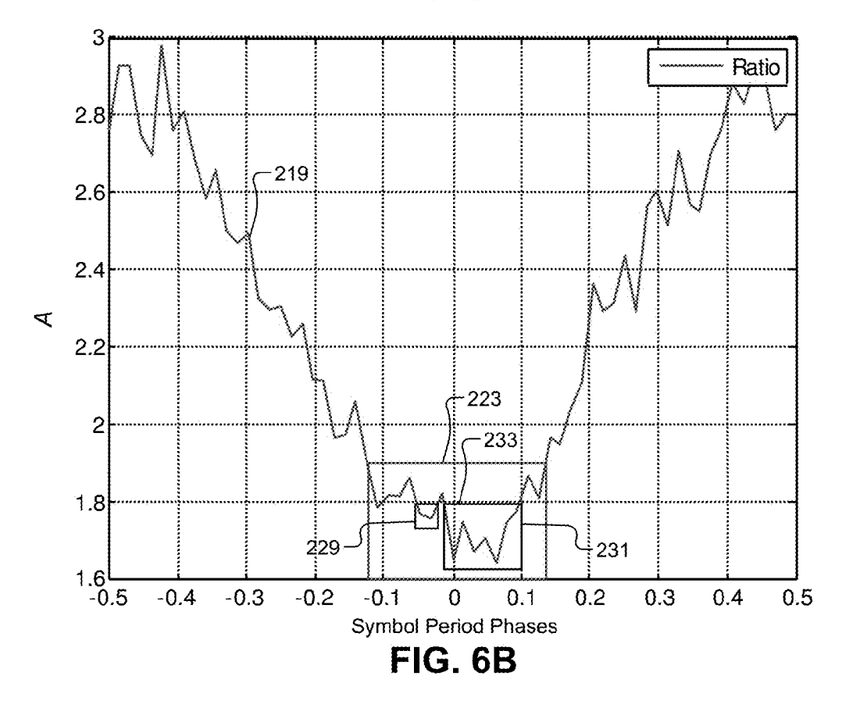
FIG. 6B is a corresponding plot of an index ratio A for the eye diagram of FIG. 6A in accordance with an aspect of the present disclosure.

At 214, the one or more eye opening modules may determine a number of clusters of index ratios that are less than or equal to a second predetermined index ratio threshold. Note that if little to no noise exists, then only a single cluster may be found. On the other hand, if a significant amount of noise is present, then multiple clusters may be found. Each of the clusters is a possible cluster that may be selected. Each of the clusters includes index ratios for consecutively monitored phases for which none of the phases in the cluster has a corresponding index ratio greater than the second predetermined index ratio threshold. A first point in the series of index ratios of a cluster may be referred to as a left-most stopping point. A last point in the series of index ratios of the cluster may be referred to as a right-most stopping point. The clusters may be identified by the first point and last point and include the index ratio points between the first point and last point. As a first example, the second predetermined index ratio threshold of FIG. 5B is 1.2. FIG. 5B shows a single cluster of index ratios 225 that are less than or equal to the second predetermined index ratio threshold 227. As another example, the second predetermined index ratio threshold of FIG. 6B is 1.8. FIG. 6B shows two clusters of index ratios 229, 231 that are less than or equal to the second predetermined index ratio threshold 233. The clusters 225, 229, 231 are referred to as low-ratio clusters because the corresponding index ratios are less than or equal to the corresponding one of the second predetermined index ratio thresholds 227, 233. The second predetermined index ratio thresholds 227, 233 may be determined empirically using simulations and field tests.

At 216, the one or more eye opening modules determine a width of each of the clusters and which of the clusters has the largest width. The units of measure for the widths may be radians. The widths may be referred to as eye opening lengths corresponding respectively to the clusters. A width of a cluster may refer to a difference between a maximum phase and a minimum phase of the cluster. For example, the width of the first cluster 22 of FIG. 6B is (−0.3)−(−0.5) or 0.2, whereas the width of the second cluster 231 is 0.1−(−0.2) or 1.2. Thus, the second cluster 231 is wider than the first cluster 229.

At 218, the one or more eye opening modules and/or one or more phase modules (e.g., the phase modules 78, 80) determine a phase mid-point of the widest cluster determined at 216. The phase mid-point is a halfway point between the minimum phase and the maximum phase of the widest cluster. The phase mid-point provides a maximum signal quality. In addition to providing a maximum signal quality, the cluster with the widest opening may be used for advancing signal processing. For example, the mid (or center) point of the widest cluster may be used as a predetermined (or best) sampling point for achieving maximum receiving performance. The determined phase may provide maximum horizontal and/or vertical eye opening values. This may be determined based on the characteristics of the eye openings as determined during one or more iterations of the method of FIG. 4.

At 220, the one or more phase modules may adjust phase of the output signal being transmitted to match the phase determined at 218. The first phase module 78 at the first front end module 162 may adjust the phase determined by the first phase module 78. In addition or as an alternative, the second front end module 164 may signal the first front end module 162 the phase determined at 218 by the second phase module 80. The output signal may then be transmitted having the updated phase. The phase may be adjusted based on the eye opening characteristics determined during one or more iterations of the method of FIG. 4. For example, if a certain iteration provides better characteristics than another iteration, then the phase may be adjusted to provide the better characteristics. The method may end at 222 or may return to task 202.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described method provides criteria for evaluating eye openings for amplitude and frequency modulated signals, which includes monitoring essentially vertical eye opening variance by monitoring index ratios as described above. The index ratios are also used to check horizontal eye openings including determining a widest cluster of index ratios. A phase in a symbol period is selected that best balances between a maximum horizontal eye opening (affected by timing jitters) and a maximum vertical eye opening (affected by noise and interference). The disclosed method provides an improved technique for dealing with random jitter and deterministic jitter from inter-symbol interference.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A first network device comprising:
    a modulation module configured to amplitude modulate or frequency modulate a data signal to generate a modulated signal;
    a transmit module configured to transmit an output signal based on the modulated signal;
    a front end module configured to obtain a phase of a point in a first cluster of index ratios, wherein each of the index ratios corresponds to a respective phase of a respective symbol period of the output signal, and wherein each of the index ratios is based on (a) a maximum amplitude of the output signal over the symbol periods, (b) a minimum amplitude of the output signal over the symbol periods, or (c) a mean of a plurality of amplitudes of the output signal over the symbol periods, wherein the plurality of amplitudes for each of the means includes a corresponding one of the maximum amplitudes and a corresponding one of the minimum amplitudes; and
    a phase module configured to adjust a phase of the output signal based on the phase of the point in the first cluster of index ratios.

2. The first network device of claim 1, wherein each of the index ratios is based on (a) the maximum amplitude of the output signal over the symbol periods, (b) the minimum amplitude of the output signal over the symbol periods, and (c) the mean of the plurality of amplitudes of the output signal for the symbol periods.

3. The first network device of claim 1, further comprising an eye opening module configured to evaluate a vertical eye opening of an eye diagram of the output signal by (i) determining a plurality of index ratios over the symbol periods, wherein the plurality of index ratios includes the first cluster of index ratios, (ii) determining the first cluster of index ratios based on a predetermined threshold, and (iii)

selecting the point in the first cluster of index ratios to maximize the vertical eye opening.

4. The first network device of claim 1, further comprising an eye opening module configured to (i) determine a plurality of index ratios for the output signal, (ii) based on a first predetermined index ratio threshold, determine a minimum phase and a maximum phase for the plurality of index ratios, and (iii) based on the minimum phase and the maximum phase, determine a horizontal eye opening of an eye diagram of the output signal.

5. The first network device of claim 4, wherein:
the eye opening module is configured to, based on a second predetermined index ratio threshold, determine the first cluster of index ratios and a second cluster of index ratios;
each of the index ratios in the first cluster of index ratios and the second cluster of index ratios are less than or equal to the second predetermined index ratio threshold;
the second predetermined index ratio threshold is less than the first predetermined index ratio threshold; and
the plurality of index ratios includes the first cluster of index ratios and the second cluster of index ratios.

6. The first network device of claim 1, further comprising an eye opening module configured to, based on a predetermined index ratio threshold, determine the first cluster of index ratios and a second cluster of index ratios,
wherein each of the index ratios in the first cluster of index ratios and the second cluster of index ratios are less than or equal to the predetermined index ratio threshold.

7. The first network device of claim 6, wherein:
the eye opening module is configured to determine whether the first cluster is wider in phase than the second cluster; and
the phase module is configured to adjust the phase of the output signal based on whether the first cluster is wider in phase than the second cluster.

8. The first network device of claim 7, wherein:
the eye opening module is configured to determine a mid-point of the wider of the first cluster and the second cluster; and
the phase module is configured to adjust the phase of the output signal based on the mid-point to maximize a vertical eye opening or a horizontal eye opening of an eye diagram of the output signal.

9. A method comprising:
at a first network device, amplitude modulating or frequency modulating a data signal to generate a modulated signal;
based on the modulated signal, transmitting an output signal from the first network device to a second network device;
evaluating an eye opening of an eye diagram of the output signal including obtaining a phase of a point in a first cluster of index ratios, wherein each of the index ratios corresponds to a respective phase of a respective symbol period of the output signal, and wherein each of the index ratios is based on (a) a maximum amplitude of the output signal over the symbol periods, (b) a minimum amplitude of the output signal over the symbol periods, or (c) a mean of a plurality of amplitudes of the output signal over the symbol periods, wherein the plurality of amplitudes for each of the means includes a corresponding one of the maximum amplitudes and a corresponding one of the minimum amplitudes; and
adjusting a phase of the output signal based on the phase of the point in the first cluster of index ratios.

10. The method of claim 9, wherein each of the index ratios is based on (a) the maximum amplitude of the output signal over the symbol periods, (b) the minimum amplitude of the output signal over the symbol periods, and (c) the mean of the plurality of amplitudes of the output signal for the symbol periods.

11. The method of claim 9, wherein the evaluating of the eye opening comprises:
determining a plurality of index ratios over the symbol periods, wherein the plurality of index ratios includes the first cluster of index ratios;
determining the first cluster of index ratios based on a predetermined threshold; and
selecting the point in the first cluster of index ratios to maximize the eye opening.

12. The method of claim 9, further comprising:
determining a plurality of index ratios for the output signal;
based on a first predetermined index ratio threshold, determining a minimum phase and a maximum phase for the plurality of index ratios; and
based on the minimum phase and the maximum phase, determining a horizontal eye opening of the eye diagram of the output signal.

13. The method of claim 12, further comprising, based on a second predetermined index ratio threshold, determining the first cluster of index ratios and a second cluster of index ratios, wherein:
each of the index ratios in the first cluster of index ratios and the second cluster of index ratios are less than or equal to the second predetermined index ratio threshold;
the second predetermined index ratio threshold is less than the first predetermined index ratio threshold; and
the plurality of index ratios includes the first cluster of index ratios and the second cluster of index ratios.

14. The method of claim 9, further comprising, based on a predetermined index ratio threshold, determining the first cluster of index ratios and a second cluster of index ratios,
wherein each of the index ratios in the first cluster of index ratios and the second cluster of index ratios are less than or equal to the predetermined index ratio threshold.

15. The method of claim 14, further comprising determining whether the first cluster is wider in phase than the second cluster,
wherein the phase of the output signal is adjusted based on whether the first cluster is wider in phase than the second cluster.

16. The method of claim 15, further comprising determining a mid-point of the wider of the first cluster and the second cluster,
wherein the phase of the output signal is adjusted based on the mid-point to maximize a vertical eye opening or a horizontal eye opening of the eye diagram of the output signal.

17. A first network device comprising:
a receive module configured to receive an output signal from a second network device, wherein the output signal is amplitude modulated or frequency modulated;
an eye opening module configured to evaluate an eye opening of an eye diagram of the output signal including (i) determining a plurality of index ratios for the output signal, (ii) determining a first cluster of index ratios in the plurality of index ratios, and (iii) determining a point in the cluster of index ratios, wherein each of the index ratios corresponds to a respective phase of a respective symbol period of the output signal, and wherein each of the index ratios is based on (a) a maximum amplitude of the output signal over the symbol periods, (b) a minimum amplitude of the output signal over the symbol periods, or (c) a mean of a plurality of amplitudes of the output signal over the symbol periods, wherein the plurality of amplitudes for each of the means includes a corresponding one of the maximum amplitudes and a corresponding one of the minimum amplitudes; and a transmit module configured to transmit a value from the first network device to the second network device to adjust a phase of the output signal, wherein the value is indicative of a phase for the point in the cluster of index ratios.

18. The first network device of claim 17, wherein each of the index ratios is based on (a) the maximum amplitude of the output signal over the symbol periods, (b) the minimum amplitude of the output signal over the symbol periods, and (c) the mean of the plurality of amplitudes of the output signal for the symbol periods.

19. The first network device of claim 17, wherein the eye opening module is configured to (i) based on a first predetermined index ratio threshold, determine a minimum phase and a maximum phase for the plurality of index ratios, and (ii) based on the minimum phase and the maximum phase, determine a horizontal eye opening of the eye diagram of the output signal.

20. The first network device of claim 19, wherein:
the eye opening module is configured to, based on a second predetermined index ratio threshold, determine the first cluster of index ratios and a second cluster of index ratios;
each of the index ratios in the first cluster of index ratios and the second cluster of index ratios are less than or equal to the second predetermined index ratio threshold;
the second predetermined index ratio threshold is less than the first predetermined index ratio threshold; and
the plurality of index ratios includes the first cluster of index ratios and the second cluster of index ratios.

21. The first network device of claim 17, wherein the eye opening module is configured to, based on a predetermined index ratio threshold, determine the first cluster of index ratios and a second cluster of index ratios,
wherein each of the index ratios in the first cluster of index ratios and the second cluster of index ratios are less than or equal to the predetermined index ratio threshold.

22. The network device of claim 21, wherein the eye opening module is configured to (i) determine whether the first cluster is wider in phase than the second cluster, and (ii) generate the value based on whether the first cluster is wider in phase than the second cluster.

23. The network device of claim 22, wherein the eye opening module is configured to (i) determine a mid-point of the wider of the first cluster and the second cluster, and (ii) generate the value based on the mid-point to maximize a vertical eye opening or a horizontal eye opening of the eye diagram of the output signal.

24. A method comprising:
receiving an output signal at a first network device from a second network device, wherein the output signal is amplitude modulated or frequency modulated;

evaluating an eye opening of an eye diagram of the output signal including (i) determining a plurality of index ratios for the output signal, (ii) determining a first cluster of index ratios in the plurality of index ratios, and (iii) determining a point in the cluster of index ratios, wherein each of the index ratios corresponds to a respective phase of a respective symbol period of the output signal, and wherein each of the index ratios is based on (a) a maximum amplitude of the output signal over the symbol periods, (b) a minimum amplitude of the output signal over the symbol periods, or (c) a mean of a plurality of amplitudes of the output signal over the symbol periods, wherein the plurality of amplitudes for each of the means includes a corresponding one of the maximum amplitudes and a corresponding one of the minimum amplitudes; and transmitting a value from the first network device to the second network device to adjust a phase of the output signal, wherein the value is indicative of a phase for the point in the cluster of index ratios.

25. The method of claim 24, wherein each of the index ratios is based on (a) the maximum amplitude of the output signal over the symbol periods, (b) the minimum amplitude of the output signal over the symbol periods, and (c) the mean of the plurality of amplitudes of the output signal for the symbol periods.

26. The method of claim 24, further comprising:
based on a first predetermined index ratio threshold, determining a minimum phase and a maximum phase for the plurality of index ratio; and
based on the minimum phase and the maximum phase, determining a horizontal eye opening of the eye diagram of the output signal.

27. The method of claim 26, further comprising, based on a second predetermined index ratio threshold, determining the first cluster of index ratios and a second cluster of index ratios, wherein:
each of the index ratios in the first cluster of index ratios and the second cluster of index ratios are less than or equal to the second predetermined index ratio threshold;
the second predetermined index ratio threshold is less than the first predetermined index ratio threshold; and
the plurality of index ratios includes the first cluster of index ratios and the second cluster of index ratios.

28. The method of claim 24, further comprising, based on a predetermined index ratio threshold, determining the first cluster of index ratios and a second cluster of index ratios,
wherein each of the index ratios in the first cluster of index ratios and the second cluster of index ratios are less than or equal to the predetermined index ratio threshold.

29. The method of claim 28, further comprising:
determining whether the first cluster is wider in phase than the second cluster; and
generating the value based on whether the first cluster is wider in phase than the second cluster.

30. The method of claim 29, further comprising:
determining a mid-point of the wider of the first cluster and the second cluster; and
generating the value based on the mid-point to maximize a vertical eye opening or a horizontal eye opening of the eye diagram of the output signal.

* * * * *